(12) United States Patent
Barari et al.

(10) Patent No.: US 7,540,022 B2
(45) Date of Patent: May 26, 2009

(54) USING ONE-TIME PASSWORDS WITH SINGLE SIGN-ON AUTHENTICATION

(75) Inventors: Tirthankar Barari, Sharon, MA (US); Leonid Elkun, Germantown, MD (US); Elias Zaretsky, Foxborough, MA (US)

(73) Assignee: Nokia Corporation, Espoo (FI)

( * ) Notice: Subject to any disclaimer, the term of this patent is extended or adjusted under 35 U.S.C. 154(b) by 825 days.

(21) Appl. No.: 11/173,382

(22) Filed: Jun. 30, 2005

(65) Prior Publication Data

US 2007/0006291 A1 Jan. 4, 2007

(51) Int. Cl.
*G06F 17/30* (2006.01)
(52) U.S. Cl. .................................. 726/10; 726/8; 726/5
(58) Field of Classification Search .................... 726/10, 726/8, 5
See application file for complete search history.

(56) References Cited

U.S. PATENT DOCUMENTS

| 5,684,950 A | 11/1997 | Dare et al. |
| 5,841,871 A | 11/1998 | Pinkas |
| 2006/0094403 A1 | 5/2006 | Norefors et al. |

OTHER PUBLICATIONS

Single password, multiple accounts Saravanakumar, E.; Mohan, A.; Computing, Communication and Networking, 2008. ICCCn 2008. International Conference on Dec. 18-20, 2008 pp. 1-7.*

A Design of One-Time Password Mechanism Using Public Key Infrastructure Kim, H.-C.; Lee, H.-W.; Lee, K.-S.; Jun, M.-S.; Networked Computing and Advanced Information Management, 2008. NCM '08. Fourth International Conference on vol. 1, Sep. 2-4, 2008 pp.18-24.*

A common password method for protection of multiple accounts Luo, H.; Henry, P.; Personal Indoor and Mobile Radio Communications, 2003. PIMRC 2003. 14th IEEE Proceedings on vol. 3, Sep. 7-10, 2003 pp. 2749-2754 vol. 3.*

B. Clifford Neuman and Theodore TS'O, Kerberos: An Authentication Service for Computer Networks, Retrieved Jun. 27, 2005 from Internet Site http://www.isi.edu/gost/publications/kerberos-neuman-tso.html, pp. 1-11 (no admission that this constitutes prior art).

Kerberos, 21.5. Kerberos, Retrieved Jun. 27, 2005 from Internet Site http://www.hn.edu.cn/book/NetWork/networkingBookshelf_2ndEd/fire/ch21_05.htm, pp. 1-6 (no admission that this constitutes prior art).

Hornstein et al., Integrating Single-use Authentication Mechanisms with Kerberos, Retrieved Jun. 27, 2005 from Internet Site http://www.ietf.org/proceedings/04aug/I-D/draft-ietf-krb-wg-kerberos-sam-03.txt, pp. 1-18 (no admission that this constitutes prior art).

Wikipedia, Kerberos (protocol), Retrieved Jun. 27, 2005 from Internet Site http://en.wikipedia.org/wiki/Kerberos_(protocol), pp. 1-4 (no admission that this constitutes prior art).

(Continued)

*Primary Examiner*—David Y Jung
(74) *Attorney, Agent, or Firm*—Alston & Bird LLP

(57) ABSTRACT

A method, computer program product, authentication proxy server, and system for enabling a user to use a one-time password in conjunction with single sign-on authentication and external authentication, such as provided by the Kerberos protocol, are provided.

28 Claims, 6 Drawing Sheets

OTHER PUBLICATIONS

Wikipedia, Single sign-on, Retrieved Jun. 27, 2005 from Internet Site http://en.wikipedia.org/wiki/Single_sign-on, p. 1 of 1 (no admission that this constitutes prior art).

Kohl et al., The Kerberos Network Authentication Service (V5), Retrieved Jun. 27, 2005 from Internet Site http://www.ietf.org/rfc/rfc1510.txt, pp. 1-105, Network Working Group (no admission that this constitutes prior art).

M. Horowitz, Kerberos Change Password Protocol, Retrieved Dec. 7, 2006 from Internet Site http://www.3ietf.org/proceedings/98dec/I-D/draft-ietf-cat-kerb-chg-password-02.txt, pp. 1-5, Network Working Group.

J. Kohl et al., The Kerberos Network Authentication Service (V5), Retrieved Dec. 7, 2006 from Internet Site http://www.ietf.org/rfc/rfc1510, pp. 1-99, Network Working Group.

International Search Report from PCT/IB2006/001705, dated Dec. 13, 2006.

* cited by examiner

USING ONE-TIME PASSWORDS WITH SINGLE SIGN-ON AUTHENTICATION

FIELD OF THE INVENTION

This invention relates to authentication mechanisms, and more particularly to a mechanism for using one-time passwords (OTPs) in conjunction with single sign-on (SSO) authentication.

BACKGROUND OF THE INVENTION

Single sign-on (SSO) is a specialized form of software authentication that enables a user to authenticate once and gain access to the resources of multiple software systems. In other words, SSO refers to a user's ability to log into a particular system, e.g., Windows 2000, and have that login information (i.e., username and password) be leveraged to all applications subsequently accessed during the login session, e.g., Microsoft Outlook.

Kerberos, which is a computer network authentication protocol originally developed by the Massachusetts Institute of Technology (MIT), and which is described in the Internet Engineering Task Force (IETF) *Network Working Group Request for Comment:* 1510, September 1993, the contents of which are incorporated herein by reference in their entirety, is a popular mechanism for applications to externalize authentication entirely. In general, under the Kerberos protocol, a user signs into a Kerberos server, which acts as a trusted third party, and is issued a ticket. The user's client applications can then present the ticket to various application servers that they wish to access.

More specifically, Kerberos, which uses a Key Distribution Center (KDC) consisting of an Authentication Server (AS) and a Ticket Granting Server (TGS), maintains a database including a shared secret key for each of the entities on a network (i.e., clients and servers). Each key in the database is known only to the network entity and Kerberos. When a client wishes to communicate with an application server, Kerberos will generate a session key that the entities can use to secure their interactions, encrypt the session key using the client's secret key, and transmit it to the client. The client can then use its secret key (i.e., its unique password) to decrypt the session key. Knowledge of the secret key, therefore, serves to prove the identity of the client.

Kerberos will also transmit a "ticket" to the client that contains the client's identity, the same session key, a timestamp, and other information, all encrypted using the application server's secret key. The client transmits this ticket to the application server it wishes to access, which decrypts the session key using its secret key. The server and client will then use the session key, which is now known to each of them, to communicate with one another. The combination of the ticket and the encrypted session key transmitted to the client by the Kerberos server is referred to as a "credential."

In order to enable SSO authentication, the ticket gathering process involves two separate phases. In the first phase, the client requests a master ticket from the Kerberos Authentication Server (AS), and uses its password to complete the process. In particular, the client sends an authentication request to the AS, and in return receives a session key encrypted with the client's secret key/password along with a Ticket Granting Ticket (TGT). At this point the client will decrypt the session key using its password, and save the decrypted key and TGT. In the second phase, the client presents the master ticket (or TGT) to the Ticket Granting Server (TGS) and asks for a new ticket that can be used to access a particular application server. Specifically, the client sends a ticket request (or in essence a second authentication request) including the TGT and an identification of the application server to the TGS, and in response receives a Session, or Service, Ticket (ST). The ticket (i.e., the ST) that is returned to the client is encrypted; first with the secret key of the application server and then with the session key (received after the first ticket request and decrypted using the password). The client then uses the session key to decrypt one level of authentication, leaving the ticket encrypted only with the application server's secret key. The client can then send this ticket to the application server which can decrypt the ticket using its secret key to obtain the session key which will thereafter be utilized to support encrypted communications between the client and the server.

The first phase discussed above is only performed once—upon first logging into the system. The second phase is then repeated each time the user wishes to access a different application. Because the second ticket is encrypted with the session key, rather than the client's secret key/password, this enables the user to sign on using his or her password once, and then subsequently access various applications without having to re-sign on using a password—i.e., SSO authentication.

As illustrated, the typical Kerberos authentication system relies on a database that has a mapping of usernames to respective passwords, or secret keys. Kerberos, therefore, works only where the user has a static, or permanent, password. However, many organizations, for security reasons, now require the use of one-time passwords (OTPs) for any user authentication. An OTP is a password that repeatedly changes over time at various intervals. Using OTPs, rather than static passwords, increases the security of the communication since each password is only valid for a specified period of time. If an intruder becomes aware of a user's password at one point in time, therefore, the intruder would likely not be able to use that password at some later point in time.

As stated above, however, Kerberos would fail to work in conjunction with OTPs, since Kerberos relies on a permanent (or semi-permanent, since the user can change his or her password) password being mapped to the username in a database that is accessible by the AS. A need, therefore, exists for a means by which a user can use OTPs, yet still have the benefit of single sign-on authentication provided by Kerberos.

BRIEF SUMMARY OF THE INVENTION

Generally described, various exemplary embodiments of the present invention provide an improvement over the known prior art by providing a mechanism that allows a user to use a one-time password (OTP) in conjunction with single sign-on (SSO) authentication. In particular, exemplary embodiments of the present invention introduce an Authentication Proxy Server that sits in front of the Kerberos infrastructure and handles all traffic between the client and Kerberos. The Proxy Server authenticates the OTP received from the client, and then updates the Kerberos database with the authenticated OTP. The latest OTP can thereafter be used as the "permanent" password for authenticating the user to an Authentication Server (AS).

According to one aspect of the present invention a method of enabling a user to use a one-time password (OTP) in conjunction with single sign-on (SSO) authentication is provided. In one exemplary embodiment, the method includes: (1) receiving an authentication request, wherein the authentication request includes a username and an OTP associated with the user; (2) authenticating the OTP using a password authentication server (PAS); and (3) updating a database, which includes a plurality of usernames associated with a plurality of users mapped to a respective password, with the authenticated OTP, such that the password mapped to the username associated with the user in the database is the authenticated OTP. According to exemplary embodiments of the invention, an authentication server has access to the database and uses the password (in this case the OTP) mapped to the user's username in the database to provide the user with SSO authentication.

In one exemplary embodiment, the authentication server provides SSO authentication by using the OTP mapped to the user's username in the database to encrypt a session key and to generate a master ticket. The authentication server transmits the encrypted session key and generated master ticket to the user, by way of the authentication proxy server. The user can then use the master ticket to request one or more service tickets to be used to access a respective application server. To that end, various exemplary embodiments of the method further include: (1) receiving a service ticket request including the master ticket; (2) transmitting the service ticket request to a ticket granting server; (3) receiving a service ticket in response, wherein the service ticket has been encrypted using a secret key of a respective application server; and (4) transmitting the service ticket received to the user. In exemplary embodiments of the present invention the preceding steps are repeated each time the user wishes to access a different application server.

According to another aspect of the invention, an Authentication Proxy Server for enabling a user to use a one-time password (OTP) in conjunction with single sign-on (SSO) authentication is provided. In various exemplary embodiments, the Authentication Proxy Server comprising means for performing the respective steps of the methods discussed above.

According to yet another aspect of the present invention, a computer program product for enabling a user to use a one-time password (OTP) in conjunction with single sign-on (SSO) authentication is provided. In one exemplary embodiment, the computer program product includes at least one computer-readable storage medium having computer-readable program code portions stored therein. These computer-readable program code portions may include: (1) a first executable portion for receiving an authentication request, wherein the authentication request includes a username and an OTP associated with the user; (2) a second executable means for authenticating the OTP using a password authentication server (PAS); and (3) a third executable means for updating a database, which includes a plurality of usernames associated with a plurality of users mapped to a respective password, with the authenticated OTP, such that the password mapped to the username associated with the user in the database is the authenticated OTP. According to exemplary embodiments of the invention, an authentication server has access to the database and uses the password (in this case the OTP) mapped to the user's username in the database to provide the user with SSO authentication.

According to yet another aspect of the invention a system for enabling a user to use a one-time password in conjunction with single sign-on (SSO) authentication is provided. In one exemplary embodiment the system includes a client application, an authentication proxy server, a password authentication server (PAS), a database, and an authentication server. According to exemplary embodiments, the authentication proxy server is configured to receive an authentication request from the client application including a username and OTP associated with the user, and to authenticate the OTP using the PAS. The authentication proxy server is further configured to update the database with the authenticated OTP and to transmit the authentication request to the authentication server. The authentication server is thereby configured to access the database in order to retrieve the authenticated OTP mapped to the username associated with the user, and then use the authenticated OTP to provide SSO.

In one exemplary embodiment, the system further includes a ticket granting server configured to receive service ticket requests sent by the client application via the authentication proxy server, wherein service ticket requests include the respective master ticket previously generated by the authentication server. The ticket granting server is further configured to encrypt a service ticket using a secret key of a respective application server and transmit the encrypted service ticket to the user by way of the authentication proxy server. In one exemplary embodiment the authentication server is a Kerberos Authentication Server (AS) and the ticket granting server is a Kerberos Ticket Granting Server (TGS).

BRIEF DESCRIPTION OF THE DRAWING

Figure 1:
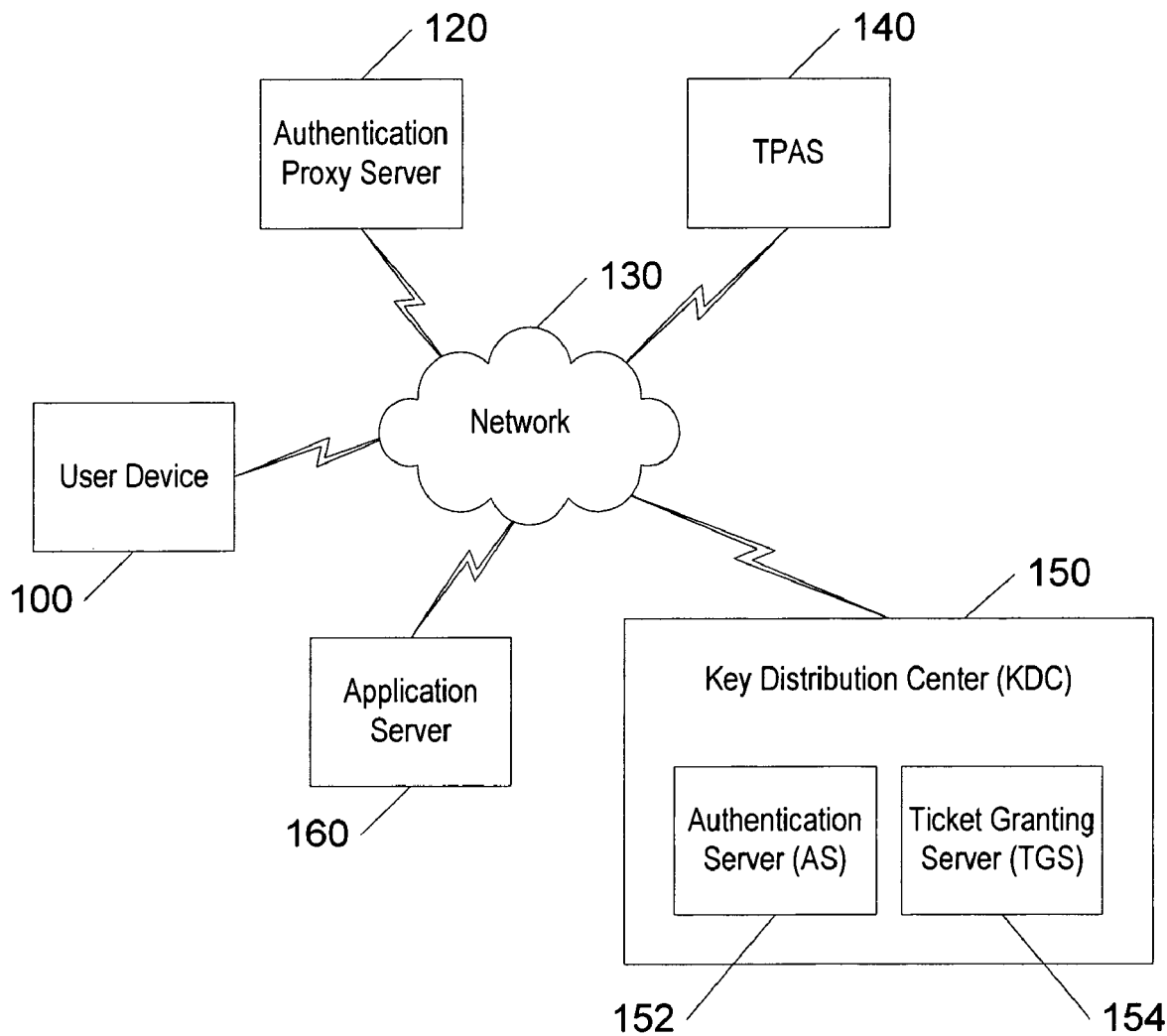
Figure 2:
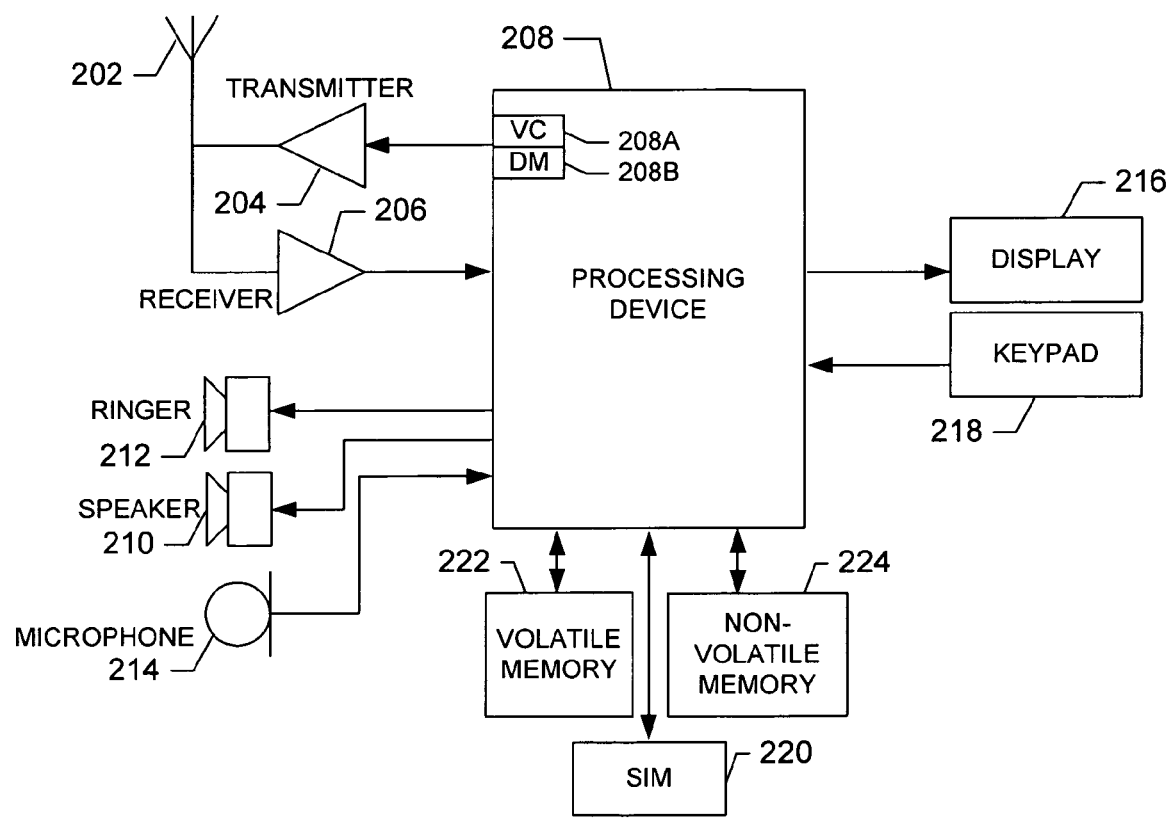
Figure 3:
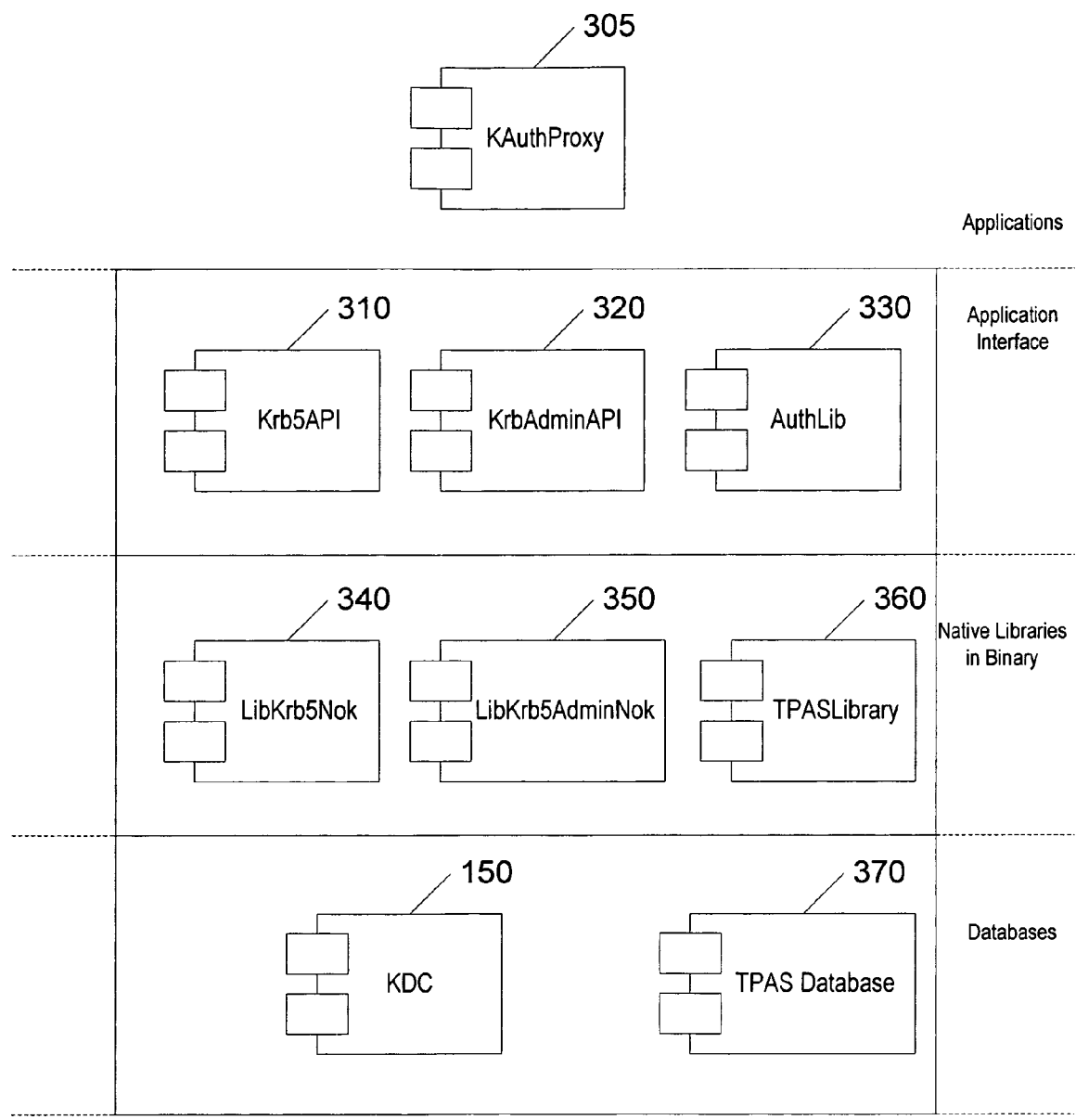
Figure 4:
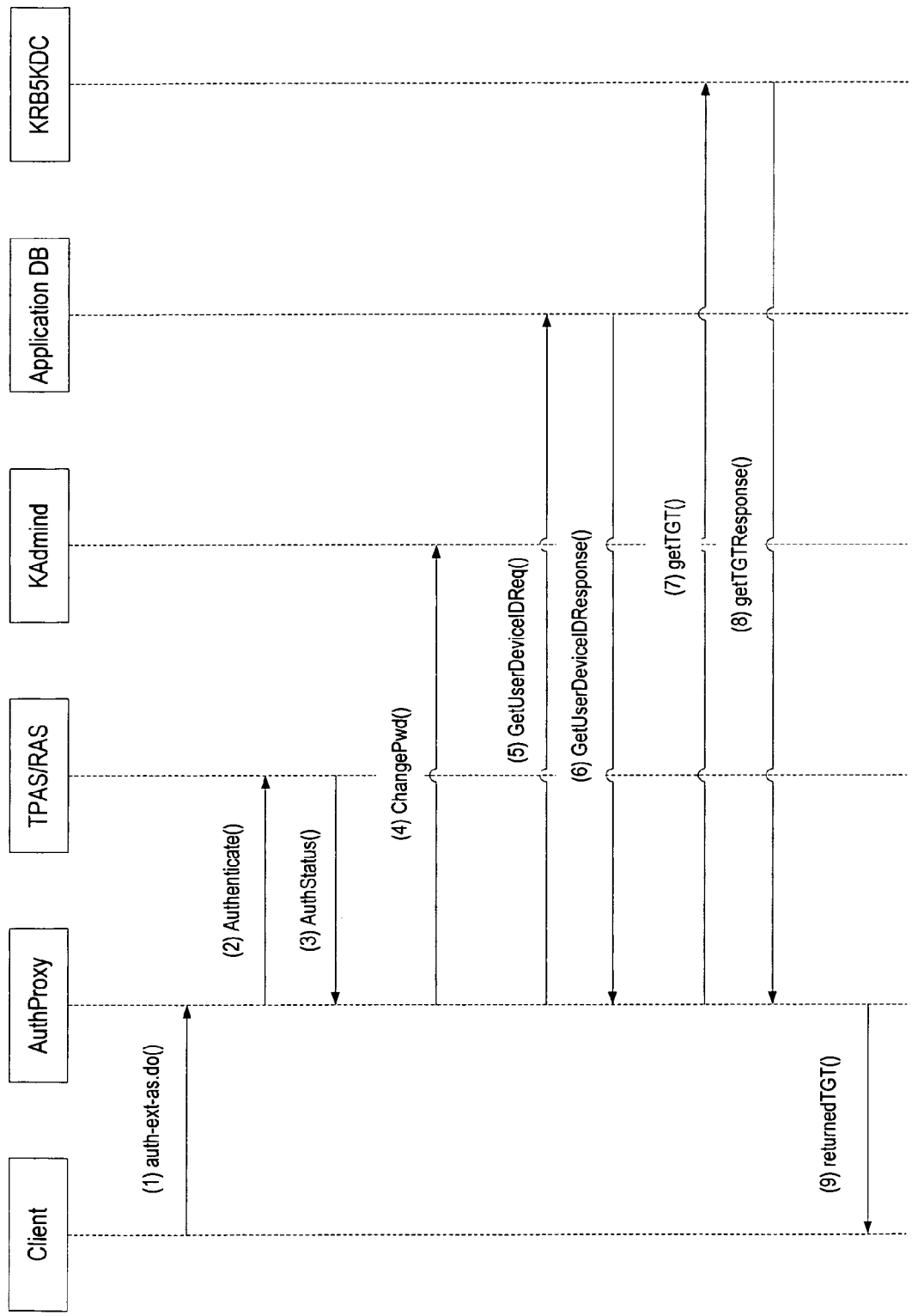
Figure 5:
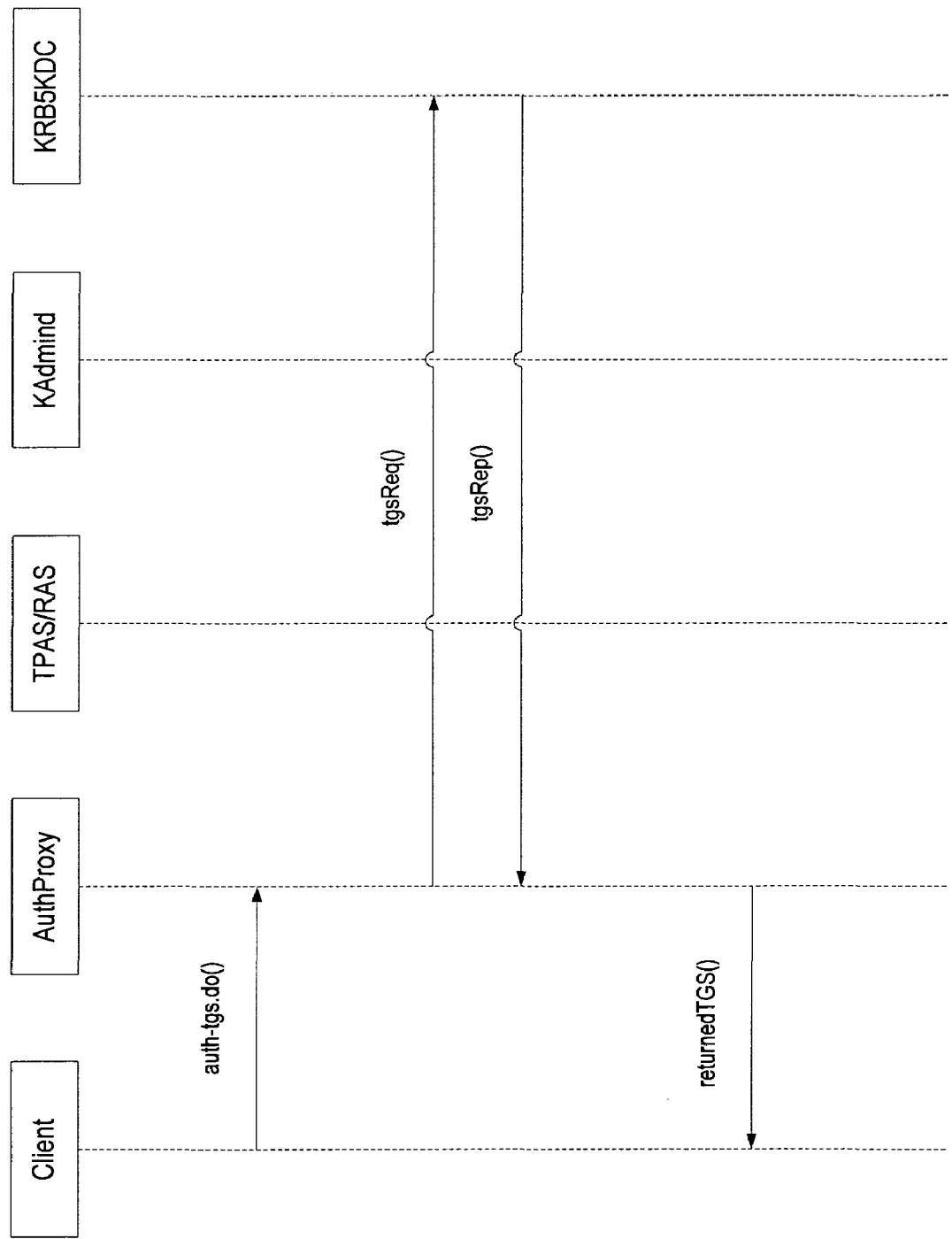
Figure 6:
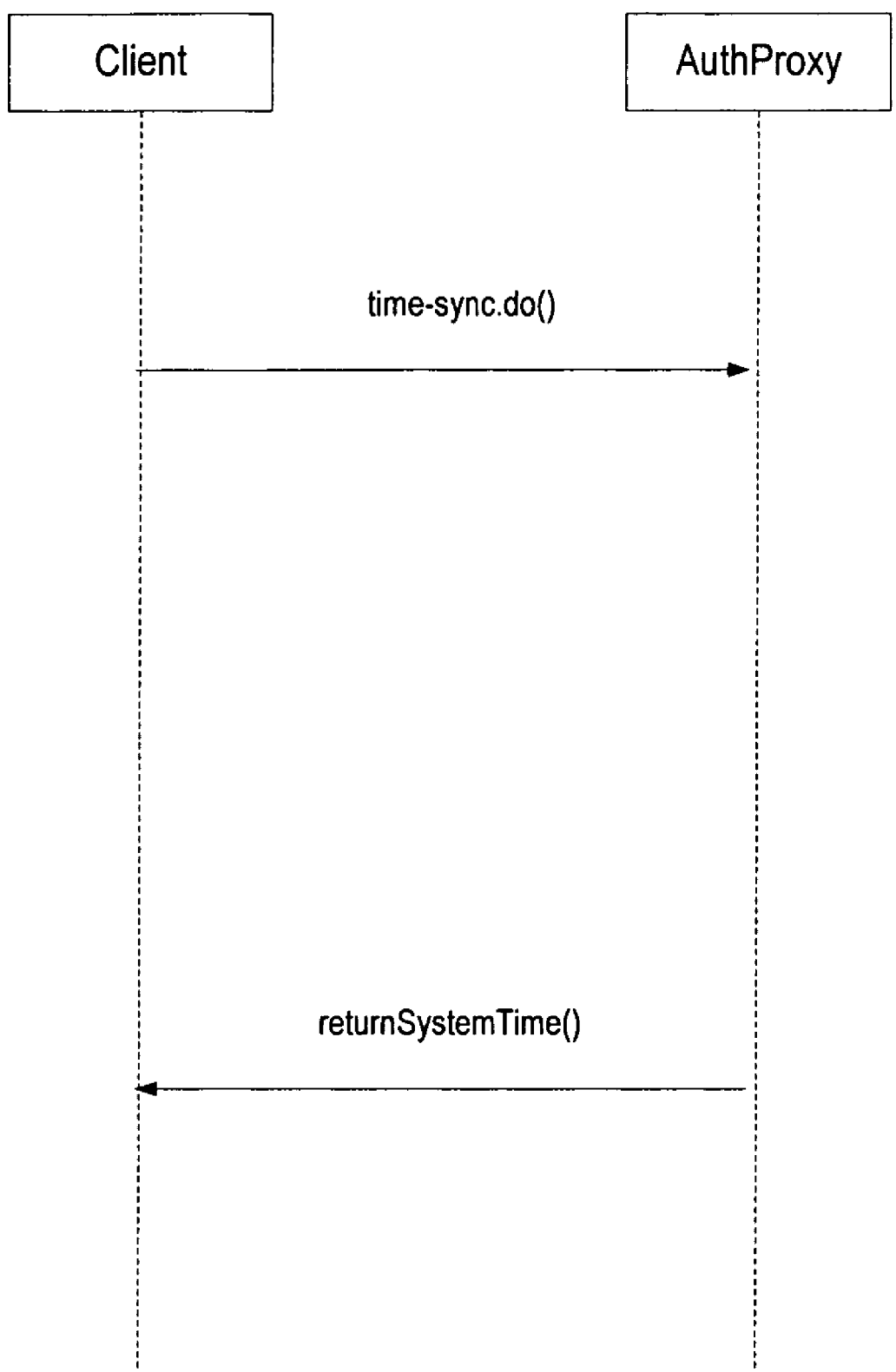

Having thus described the invention in general terms, reference will now be made to the accompanying drawings, which are not necessarily drawn to scale, and wherein:

FIG. 1 is a block diagram of a system that would benefit from exemplary embodiments of the present invention;

FIG. 2 is a schematic block diagram of a mobile station capable of operating in accordance with an embodiment of the present invention;

FIG. 3 is a component level view of an authentication service in accordance with exemplary embodiments of the present invention;

FIG. 4 is a signal flow diagram illustrating the first of two sequences for granting a ticket in accordance with exemplary embodiments of the present invention;

FIG. 5 is a signal flow diagram illustrating the second sequence for granting a ticket in accordance with exemplary embodiments of the present invention; and FIG. 6 is a signal flow diagram illustrating the sequence of signals required for time synchronization in accordance with exemplary embodiments of the present invention.

DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview:

Exemplary embodiments of the present invention provide a mechanism by which a user can use an OTP in conjunction with SSO authentication and the Kerberos protocol. In particular, according to exemplary embodiments of the present invention, a user can log into a particular system using an ever-changing password, and thereafter access additional application servers during that login session without having to re-enter his or her password. In general, this is accomplished by the introduction of an Authentication Proxy Server that handles communications between a client application and the Kerberos infrastructure, in order to authenticate the client's OTP prior to updating the Kerberos database with the authenticated OTP. While embodiments of the present invention will be described in conjunction with the Kerberos protocol for purposes of example, other embodiments of the present invention may be employed in conjunction with other external authentication techniques which utilize a trusted third party that issues tickets or the like to a client for facilitating authentication with various application servers.

In particular, when a client wishes to access a particular application server, it first sends a username and password, in this case an OTP, to the Proxy Server. The Proxy Server can be means, such as a processing device, e.g., a processor, controller, computing device or the like, for performing the various functions described below. In this regard, the Proxy Server authenticates the user to a password authentication server, such as a Third Party Authentication Server (TPAS), using the username and OTP provided. If the authentication is successful, the Proxy Server updates the Kerberos database with the user's new, or latest, password. As discussed above, the Kerberos protocol relies on a mapping of usernames to passwords or secret keys. The Kerberos Authentication Server (AS) uses this password to encrypt tickets sent to the client for use in accessing various application servers. In order for OTPs to be used, this database must be updated with the latest OTP each time the user seeks authentication. According to various exemplary embodiments of the present invention, the Proxy Server performs this updating step.

Once the password has been updated, the Proxy Server requests a Ticket Granting Ticket (TGT) (i.e., the master ticket) from the AS. The AS uses the updated password to encrypt a session key, which it transmits with the TGT to the client via the Proxy Server. To obtain a ticket that includes the information necessary to access an application server, the client subsequently uses the TGT received to request a service ticket from the Ticket Granting Server (TGS). This request, like the original request, goes through the Proxy Server, and is repeated each time the user wishes to access a different application server.

System and Terminal Architecture:

Referring to FIG. 1, an illustration of one type of system that would benefit from the present invention is provided. As shown, the system may include a user device 100, such as, a cellular telephone, portable digital assistant (PDA), pager, personal computer (PC), laptop, or tablet, or any other similar device. The device 100 may be connected to an Authentication Proxy Server 120 via a data network 130, such as, for example, a local area network (LAN), wireless local area network (WLAN), metropolitan area network (MAN), and/or wide area network (WAN). The Proxy Server 120, in turn, may be in communication, via the network 130, with a Third-Party Authentication Server (TPAS) 140, for the purposes of authenticating the user using the username and OTP provided to the Proxy Server 120 by the user device 100. The Proxy Server 120 is further in communication, via the network 130, with a Key Distribution Center (KDC) 150, such as a Kerberos Key Distribution Center, for the purposes of updating the user's password and requesting, and receiving, Ticket Granting Tickets (TGTs) and Service Tickets (STs). In the exemplary embodiment shown, the KDC 150 has at least two components, the Authentication Server (AS) 152, such as the Kerberos Authentication Server, and the Ticket Granting Server (TGS) 154. Finally, one or more application servers 160 are capable of being communicated with by the user device 100 via the data network 130 using the ST issued by the TGS 154.

While in exemplary embodiments illustrated and discussed herein, the KDC 150, TPAS 140, Application Server 160 and Authentication Proxy Server 120 are separate interacting entities, it will be understood by those of skill in the art that these elements may physically reside in or be co-located as one network entity or, in contrast, they may be distributed over multiple interconnected entities.

In one exemplary embodiment, the digital device 100 may be a mobile terminal, or mobile station, shown in detail in FIG. 2. The mobile terminal, or other digital device, includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include an antenna 202, a transmitter 204, a receiver 206, and means, such as a processing device 208, e.g., a processor, controller or the like, that provides signals to and receives signals from the transmitter 204 and receiver 206, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 208, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 208 thus also includes the functionality to convolutionally encode and interleave message and data prior to modulation and transmission. The processing device can additionally include an internal voice coder (VC) 208A, and may include an internal data modem (DM) 208B. Further, the processing device 208 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 210, a ringer 212, a microphone 214, a display 216, all of which are coupled to the controller 208. The user input interface, which allows the mobile device to receive data, can comprise any of a number of devices allowing the mobile device to receive data, such as a keypad 218, a touch display (not shown), a microphone 214, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 220, a removable user identity module (R-UIM) (not shown), or the like, which typically stores information elements related to a mobile subscriber. In addition to the SIM, the mobile device can include other memory. In this regard, the mobile station can include volatile memory 222, as well as other non-volatile memory 224, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for enabling the mobile station to generate and send a request for a TGT, and subsequently one or more STs, to a Key Distribution Center (KDC) by way of an Authentication Proxy Server using a OTP. The memory may further store computer program code for enabling the mobile station to decrypt a session key received from the KDC, by way of the Proxy Server, for use in subsequent communications with one or more application servers.

The system, method, device and computer program product of exemplary embodiments of the present invention are primarily described in conjunction with mobile communications applications. It should be understood, however, that the system, method, device and computer program product of embodiments of the present invention can be utilized in conjunction with a variety of other applications, both in the mobile communications industries and outside of the mobile communications industries. For example, the system, method, device and computer program product of exemplary embodiments of the present invention can be utilized in conjunction with wireline and/or wireless network (e.g., Internet) applications.

Also, it should be understood that while the terminal was illustrated and described as comprising a mobile telephone, mobile telephones are merely illustrative of one type of terminal that would benefit from the present invention and, therefore, should not be taken to limit the scope of the present invention. While several embodiments of the terminal are illustrated and described for purposes of example, other types of terminals, such as portable digital assistants (PDAs), pagers, laptop computers, tablets, and other types of electronic systems including both mobile, wireless devices and fixed, wireline devices, can readily employ embodiments of the present invention.

Component Level

FIG. 3 provides a component level view of an authentication service in accordance with exemplary embodiments of the present invention. As shown, the authentication service is comprised of three layers of components that are invisible to the client applications: an Application Interface layer, a layer for Native Libraries in Binary, and a layer of Databases. The Authentication Proxy Server 305, which is designated as KAuthProxy, is the only component of the service that is visible to the client applications. The functionality of this component is discussed in detail below.

In one exemplary embodiment, the Application Interface layer may include the Kerberos Application Programming Interface (API) (KrbAPI) 310, the Kerberos Administration API (KrbAdminAPI) 320 and the Authentication Library (AuthLib) 330. The KrbAPI 310 is used by the KAuthProxy 305 to interact with the KDC 150 for retrieving TGTs and STs, verifying tickets, and getting the local time on the KDC server, discussed below. The KrbAdminAPI 320 is used by the KAuthProxy 305 primarily to change the user's password in the KDC 150 once the OTP has been authenticated. The KrbAdminAPI 320 further implements the methods used to create, delete and list users in the KDC 150. Finally, the AuthLib 330 is used by KAuthProxy 305 to authenticate users to the configured authentication mechanism. This could be either an all-purpose application database, or a supported preexisting Third-Party Authentication Server (TPAS), such as RADIUS (Remote Authentication Dial-In User Service), or LDAP (Lightweight Directory Access Protocol).

The Native Libraries in Binary layer of the illustrated embodiment includes the Kerberos Native Library (LibKrb5Nok) 340, the Kerberos Administration Native Library (LibKrb5AdminNok) 350, and the TPAS 360 libraries. These libraries are shared object/dynamic libraries that are tied to the operating system and serve the language specific Application Interface calls from above.

Finally, the Database layer includes the KDC 150, and the TPAS Database 370, which is used to authenticate the user's OTP.

In one exemplary embodiment, the KAuthProxy 305, Krb5API 310, KrbAdminAPI 320, AuthLib 330, LibKrb5Nok 340, LibKrb5AdminNok 350 and the TPASLibrary 360 are all components of the Authentication Proxy Server 120 in FIG. 1. The TPAS Database 370 is a component of TPAS 140 in FIG. 1.

Method of Enabling Use of One-Time Passwords with Single Sign-On:

FIG. 4 is a signal flow diagram illustrating an exemplary signaling sequence for the first phase of the ticket granting sequence according to one embodiment of the present invention. The components involved in the sequence illustrated may include the client application, an Authentication Proxy Server (AuthProxy), a password authentication server, such as a Third-Party Authentication Server/Remote Access Server (TPAS/RAS), and the Kerberos infrastructure, which includes KAdmind, which is a daemon process that runs on the Kerberos Server and listens to any Kerberos administration request originating from a client (e.g., a request to change the password) and executes that request, and the Key Distribution Center (KRB5KDC) (i.e., the Kerberos Authentication Server (AS) and Ticket Granting Server (TGS) discussed above). An Application Database (Application DB), which is accessible by the Authentication Proxy Server, may also be involved in the signaling sequence.

As discussed above, according to exemplary embodiments of the present invention, an Authentication Proxy Server sits in between the client application and the Kerberos infrastructure in order to authenticate one-time passwords (OTPs) used by the client application and to update the Kerberos database with the authenticated passwords. The channel between the client and the Proxy Server may be over SSL, while the channel between the Proxy Server and the Kerberos infrastructure is generally encrypted using shared secret keys. As shown, the process begins where the client sends a request for authentication to the Proxy Server (AuthProxy). According to exemplary embodiments, this request includes the client's username, OTP, and the identity of the application server the client wishes to access. The Proxy Server authenticates the OTP to a TPAS (signals (2) and (3)), i.e., the Proxy Server provides the TPAS with the client's name and the OTP and the TPAS responds by indicating whether or not the OTP is now associated with and properly authenticates the client, and (if properly authenticated) then changes the password in the Kerberos database to the OTP using KAdmind (signal (4)). By utilizing the TPAS or other password authentication server to authenticate the OTP, the client can still utilize the external authentication provided by the Kerberos infrastructure even though the password utilized by the client is repeatedly changed since the TPAS tracks the current password associated with the client.

Signals (5) and (6) are optional signals wherein the Proxy Server verifies that the device ID associated with the device sending the authentication request corresponds with the device ID mapped to the username provided by the Application DB. This may be useful, for example, where an organization specifies that only devices that have been issued by the organization can access certain resources—e.g., an employee can only use his or her company-issued laptop to access the company's network, and not his or her personal computer.

Once the OTP has been authenticated and updated in the Kerberos database, the Authentication Proxy Server sends the request for a TGT to the Key Distribution Center (KDC), and more particularly, to the Authentication Server (AS) (signal (7)). In response, the KDC uses the password stored in its database to return an encrypted session key (i.e., encrypted with the OTP) and TGT to the Proxy Server (signal (8)), which in turn transmits the encrypted session key and TGT to the client application (signal (9)).

The second phase of the ticket granting sequence is illustrated in FIG. 5 in which a ticket for use with a respective application server is requested. Similar to the first phase, the Authentication Proxy Server communicates a request from the client application for a ticket to the KDC. In this instance, however, the client is requesting a service ticket (ST), discussed above, and the request goes to the Ticket Granting Server (TGS), rather than the AS, within the KDC. As discussed above, the request sent by the client application, and relayed by the Proxy Server, includes the TGT received in the first phase and the identification of the application server. In response, the KDC/TGS returns the ST encrypted both with the session key (rather than the OTP) and the secret key of the application server to the client application, typically via the Proxy Server. The client application may then decrypt the ST with the session key that has been previously provided. The ST, however, generally remains encrypted with the secret key of the application server. The client application can then provide the ST to the application server, which can decrypt the ST with its secret key to obtain the session key and other information noted above. Further communication during the session between the application server and the client application can then be encrypted with the session key. The second phase is repeated each time the user wishes to access a different application server.

The Authentication Proxy Server can also be used to synchronize the time referenced by the client application with that of the Kerberos infrastructure. FIG. 6 is a signal flow diagram illustrating an exemplary set of signals to achieve this synchronization. In general, synchronization is needed in order for the Kerberos protocol to work successfully. In particular, the client and the KDC should be synchronized at all times in order to prevent replay attacks. Replay attacks occur where an attacker captures data sent over the network in the course of legitimate business and sends (or "replays") the captured data to a server. This can serve to trick the server by, perhaps, attempting to impersonate a legitimate client. In order to prevent replay attacks, Kerberos messages sent over the network include an encrypted time stamp. Where the time stamp of a message received is outside of an allowed range (e.g., not within a five minute interval of the current time), the Kerberos server will ignore the message assuming that a replay attack is in progress. It is therefore necessary for the client and the server to be time synchronized at all times.

As will be appreciated by one skilled in the art, the embodiments of the present invention described above may be embodied as a system, method, proxy server or other apparatus, or computer program product. Accordingly, the present invention may take the form of an entirely hardware embodiment, an entirely software embodiment, or an embodiment combining software and hardware aspects. Furthermore, the present invention, such as the Authenication Proxy Server, the password authentication server and/or the authentication server may take the form of a computer program product on a computer-readable storage medium having computer-readable program instructions (e.g., computer software) embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described above with reference to block diagrams and signal flow illustrations of methods, apparatuses (i.e., systems) and computer program products according to an embodiment of the invention. It will be understood that each block of the block diagrams and signal flow illustrations, and combinations of blocks in the block diagrams and signal flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks, although other means for implementing the functions including various combinations of hardware, firmware and software as described herein may also be employed.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and signal flow illustrations support combinations of means for performing the specified functions, combinations of steps for performing the specified functions and program instruction means for performing the specified functions. It will also be understood that each block of the block diagrams and signal flow illustrations, and combinations of blocks in the block diagrams and signal flow illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving an authentication request, said authentication request including a username and a one time password (OTP) associated with a user;
   authenticating the OTP using a password authentication server;
   updating a database with the authenticated OTP, said database including a mapping of a plurality of usernames associated with a plurality of users to a respective password, such that the password mapped to the username associated with the user is the authenticated OTP;
   permitting the database to be accessible by an authentication server configured to use the password mapped to the username associated with the user in the database; and
   transmitting the authentication request to the authentication server to provide single sign on (SSO) authentication to the user.

2. The method of claim 1, further comprising using the OTP stored in the database, and mapped to the username associated with the user, to encrypt a session key and to generate a master ticket, said master ticket capable of being used by the user to request one or more service tickets, said service tickets capable of being used to access a respective application server.

3. The method of claim 2 further comprising:
   receiving the encrypted session key and generated master ticket from the authentication server; and
   transmitting the session key and master ticket received to the user.

4. The method of claim 3 further comprising:
   receiving a service ticket request, said service ticket request including the master ticket;
   transmitting the service ticket request to a ticket granting server;
   receiving a service ticket from the ticket granting server in response to the service ticket request, wherein said service ticket is encrypted with a secret key associated with a respective application server; and
   transmitting the service ticket received to the user.

5. The method of claim 4, wherein receiving the service ticket request, transmitting the service ticket request to the ticket granting server, receiving the service ticket and transmitting the service ticket to the user are repeated each time the user wishes to access a different application server.

6. The method of claim 4, wherein the authentication server comprises a Kerberos Authentication Server (AS), and the ticket granting server comprises a Kerberos Ticket Granting Server (TGS).

7. A computer program product, wherein the computer program product comprises at least one computer-readable storage medium having computer-readable program code portions stored therein, the computer-readable program code portions comprising:
   a first executable portion for receiving an authentication request, said request including a username and a one time password (OTP) associated with a user;
   a second executable portion for authenticating the OTP;
   a third executable portion for updating a database with the authenticated OTP, said database including a mapping of a plurality of usernames associated with a plurality of users to a respective password, such that the password mapped to the username associated with the user is the authenticated OTP
   a fourth executable portion for permitting the database to be accessible by an authentication server configured to use the password mapped to the username associated with the user in the database; and
   a fifth executable portion for transmitting the authentication request to the authentication server to provide single sign on (SSO) authentication to the user.

8. The computer program product of claim 7, further comprising a sixth executable portion for using the OTP stored in the database, and mapped to the username associated with the user, to encrypt a session key and to generate a master ticket, said master ticket capable of being used by the user to request one or more service tickets, said service tickets capable of being used to access a respective application server.

9. The computer program product of claim 8 further comprising:
   a seventh executable portion for receiving the encrypted session key and generated master ticket from the authentication server; and
   an eighth executable portion for transmitting the session key and master ticket received to the user.

10. The computer program product of claim 9, further comprising:
    a ninth executable portion for receiving a service ticket request, said request including the master ticket;
    a tenth executable portion for transmitting the service ticket request to a ticket granting server;
    an eleventh executable portion for receiving a service ticket from the ticket granting server in response to the service ticket request, wherein said service ticket is encrypted with a secret key associated with the authentication server and transmitted to the user; and
    a twelfth executable portion for transmitting the service ticket received to the user.

11. The computer program product of claim 10, wherein receiving the service ticket request, transmitting the request to the ticket granting server, receiving the service ticket and transmitting the service ticket to the user are repeated each time the user wishes to access a different application server.

12. The computer program product of claim 10, wherein the authentication server comprises a Kerberos Authentication Server (AS), and the ticket granting server is a Kerberos Ticket Granting Server (TGS).

13. A system comprising:
   a client application associated with a user;
   an authentication proxy server in communication with the client application, said authentication proxy server configured to receive an authentication request from the client application, said authentication request including a username and a one time password (OTP) associated with the user;
   a password authentication server (PAS) in communication with the authentication proxy server, wherein the authentication proxy server authenticates the OTP using the PAS;
   a database accessible by the authentication proxy server, said database including a mapping of a plurality of usernames associated with a plurality of users to a respective password, wherein said authentication proxy server is configured to update said database with said authenticated OTP, such that the password mapped to the username associated with the user is the authenticated OTP; and
   an authentication server in communication with the authentication proxy server, said authentication server configured to receive the authentication request from the authentication proxy server, and, in response, to access the database to retrieve the authenticated OTP mapped to the username associated with the user, and use said authenticated OTP to provide single sign on (SSO) authentication.

14. The system of 13, wherein the authentication server provides SSO authentication by using the OTP retrieved from the database to encrypt a session key and to generate a master ticket, said master ticket capable of being used by the client application to request one or more service tickets, said service tickets capable of being used to access a respective application server.

15. The system of claim 14, wherein said authentication server is further configured to transmit the encrypted session key and the generated master ticket to the authentication proxy server, and wherein said authentication proxy server is further configured to transmit the session key and master ticket received to the client application.

16. The system of claim 15 further comprising:
   a ticket granting server in communication with the authentication proxy server, wherein said authentication proxy server is fun her configured to receive a service ticket request, said service ticket request including the master ticket previously generated by the authentication server and an identification of a respective application server, and to transmit the service ticket request to the ticket granting server.

17. The system of claim 16, wherein the ticket granting server is configured to generate a service ticket using a secret key associated with the application server, and to transmit the service ticket to the authentication proxy server, and wherein said authentication proxy server is further configured to transmit the service ticket received to the client application.

18. The system of claim 16, wherein the authentication server comprises a Kerberos Authentication Server (AS), and the ticket granting server comprises a Kerberos Ticket Granting Server (TGS).

19. An apparatus comprising:
   means for receiving an authentication request, said authentication request including a username and a one time password (OTP) associated with a user;
   means for authenticating the OTP;
   means for updating a database with the authenticated OTP, said database including a mapping of a plurality of usernames associated with a plurality of users to a respective password, such that the password mapped to the username associated with the user is the authenticated OTP, and wherein the database is accessible by an authentication server configured to use the password mapped to the username associated with the user in the database; and
   means for transmitting the authentication request to the authentication server to provide single sign on (SSO) authentication to the user.

20. The apparatus of claim 19, wherein the authentication server provides SSO authentication by using the OTP stored in the database, and mapped to the username associated with the user, to encrypt a session key and to generate a master ticket, said master ticket capable of being used by the user to request one or more service tickets, said service tickets capable of being used to access a respective application server, and wherein said authentication proxy server further comprises:
   means for receiving the encrypted session key and generated master ticket from the authentication server; and
   means for transmitting the session key and master ticket received to the user.

21. The apparatus of claim 20 further comprising:
   means for receiving a service ticket request, said service ticket request including the master ticket;
   means for transmitting the service ticket request to a ticket granting server;
   means for receiving a service ticket from the ticket granting server in response to the service ticket request, wherein said service ticket is encrypted with the session key previously encrypted by the authentication server and transmitted to the user; and
   means for transmitting the service ticket received to the user.

22. The apparatus of claim 21, wherein receiving the service ticket request, transmitting the service ticket request to the ticket granting server, receiving the service ticket and transmitting the service ticket to the user are repeated each time the user wishes to access a different application server.

23. The apparatus of claim 21, wherein the authentication server comprises a Kerberos Authentication Server (AS), and said ticket granting server comprises a Kerberos Ticket Granting Server (TGS).

24. An apparatus comprising:
   a processor and a memory storing executable instructions that in response to execution by the processor cause the apparatus to at least perform the following:
   receive an authentication request including a username and a one time password (OTP) associated with a user;
   authenticate the OTP and update a database with the authenticated OTP, wherein the database includes a mapping of a plurality of usernames associated with a plurality of users to a respective password, such that the password mapped to the username associated with the user is the authenticated OTP, and wherein the database is also accessible by an authentication server configured to use the password mapped to the username associated with the user in the database; and
   transmit the authentication request to the authentication server to provide single sign on (SSO) authentication to the user.

25. The apparatus of claim 24, wherein the authentication server provides SSO authentication by using the OTP stored in the database, and mapped to the username associated with the user, to encrypt a session key and to generate a master ticket, said master ticket capable of being used by the user to request one or more service tickets, said service tickets capable of being used to access a respective application server, and wherein the processing device of the authentication proxy server is flirt her capable of receiving the encrypted session key and generated master ticket from the authentication server and transmitting the session key and master ticket received to the user.

26. The apparatus of claim 25 wherein said processing device is further capable of receiving a service ticket request including the master ticket, transmitting the service ticket request to a ticket granting server, receiving a service ticket from the ticket granting server in response to the service ticket request that is encrypted with a secret key associated with a respective application server and transmitting the service ticket received to the user.

27. The apparatus of claim 26, wherein receiving the service ticket request, transmitting the service ticket request to the ticket granting server, receiving the service ticket and transmitting the service ticket to the user are repeated each time the user wishes to access a different application server.

28. The apparatus of claim 26, wherein the authentication server comprises a Kerberos Authentication Server (AS), and said ticket granting server comprises a Kerberos Ticket Granting Server (TGS).

* * * * *

UNITED STATES PATENT AND TRADEMARK OFFICE
CERTIFICATE OF CORRECTION

PATENT NO.        : 7,540,022 B2
APPLICATION NO. : 11/173382
DATED             : May 26, 2009
INVENTOR(S)       : Barari et al.

It is certified that error appears in the above-identified patent and that said Letters Patent is hereby corrected as shown below:

<u>Column 13,</u>

Line 47, "fun her" should read --further--.

<u>Column 15,</u>

Line 6, "flirt her" should read --further--.

Signed and Sealed this

Twenty-second Day of September, 2009

David J. Kappos
*Director of the United States Patent and Trademark Office*